March 23, 1965

W. McDERMON 3,174,171

PIPING T WITH DEFLECTOR FOR
REMOVAL OF SPHERICAL "PIGS"

Filed July 23, 1962

INVENTOR.
WALTER McDERMON,
BY
ATTORNEY.

United States Patent Office 3,174,171
Patented Mar. 23, 1965

3,174,171
PIPING T WITH DEFLECTOR FOR REMOVAL
OF SPHERICAL "PIGS"
Walter McDermon, Houston, Tex., assignor, by mesne assignments, to Esso Research and Engineering Company, Elizabeth, N.J., a corporation of Delaware
Filed July 23, 1962, Ser. No. 211,672
3 Claims. (Cl. 15—104.06)

The present invention is directed to a T for use in a pipeline of considerable diameter. More particularly, the present invention is directed to a piping T including an internal structure which is conductive to the dependable separation of a spherical pig from a fluid flowing in the pipeline. In its most specific aspect, the present invention is directed to a piping T including a hood arrangement which divides the T into a section of greater flow velocity and a section of lesser flow velocity whereby spherical pigs may be easily and dependably separated from the flowing stream.

Spherical pigs are used in pipelines for many purposes: to clean out water and other materials adhering to the internal periphery of the pipe, to separate slugs of fluids having different compositions as they flow through the pipe, to determine the flow rate of fluids through the pipe, etc. However, a problem common to all uses of pigs within pipelines is that the pigs must at some point be remode from the flowing stream. It has hitherto been proposed to use a T structure having bars extending across the line portion of the T downstream of the outlet, in the form of a grate, so that the pig is prevented from passing further down the pipeline, with the intention that the pig be dropped through the opening. However, by reason of the Bernoulli effect, wherein the pressure in a flowing stream is lowest where the velocity is greatest, considerable trouble has been experienced in inducing the spheres to drop from the grate, instead of being retained there by the velocity of the flowing stream. By the practice of the prior art, flow velocities exceeding 4 to 5 feet per second have induced this sticking action of the sphere on the grates so that the sphere will not separate until the stream has been bypassed to lower the flow velocity therethrough. A further problem which has been experienced in the practice of the prior art is the fact that the spheres strike the grates at the full-stream velocity, resulting in a vibration of the piping of undesirable magnitude.

The T of the present invention provides a solution to both problems by dividing the flow stream within the T itself into a higher velocity portion and a lower velocity portion, the lower velocity portion being adjacent to the sphere outlet so that the sphere approaches the outlet at a velocity below that at which the Bernoulli effect would tend to maintain the sphere in the flowing stream, and below that at which objectionable vibration is experienced. Successful pig separation, using the present invention, has been accomplished at line velocities as high as 7 feet per second.

The present invention is directed to providing a T having a larger diameter adjacent the sphere outlet and reduced diameters in the line ends of the T. Within the T of the present invention, a hood structure substantially encloses the sphere outlet and is provided with guide rails and grate bars to direct the sphere substantially into the outlet, and is provided with a flow passageway of reduced diameter to allow a small amount of fluid to pass through the hooded portion.

All of the foregoing will be more clearly understood by reference to the drawings wherein.

Figure 1:
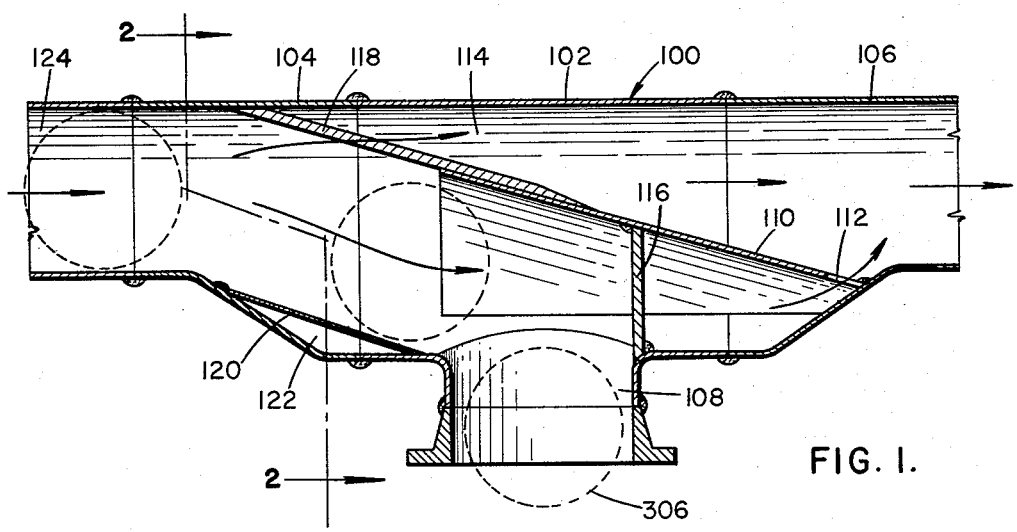
FIG. 1 is a sectional elevation of a T constructed according to the present invention.

Referring now to FIG. 1, the T of the present invention, denoted by the numeral 100, comprises a generally cylindrical section 102 of an enlarged diameter, a first upstream end means 104 and a second downstream end means 106, said end means preferably being of eccentric frusto-conical conformation, one element of the frusto-conical end means being colinear with the element of the cylindrical section which is diametrically opposite to the T opening 108 which is formed in the cylindrical portion. It is to be understood that the exterior portion of the T of the present invention can be made of standard weld T's and standard eccentric reducers, as would be apparent to a skilled engineer, or can be fabricated of rolled and/or cast steel. Preferably, standard weld T's and reducers are used.

Internally of the piping T of the present invention there is provided a concavo-convex ungula-shaped hood 110, which is provided at the downstream end with a fluid passage 112. The hood is inclined at an angle within the range from about 0° to 15° with respect to the center line of the T. The fluid passage 112 may suitable comprise from about 10% to about 20% of the clear flow area within the T. The clear flow area (designated generally by the numeral 114) is formed around the periphery of the hood between the external surface of the hood and the internal surface of the piping T, and is measured at the maximum extension of the hood 110. It has been found that a suitable and preferred ratio of area between the flow passage 112 and the clear area 114 is about 1:10 to 1:5.

It is further apparent from FIG. 1 that the hood 110 comprises grate bars 116, extending to the hood 110 from points adjacent the opening 108 which are remote from the first end, thereby forming a barrier preventing the spheres from becoming wedged between the hood and the T opening. Further, extension bars 118 are provided which are attached to and extend from the hood 110 to a point in contact with the first end means 104. The extension bars 118, shown as being five in number, guide the spheres into the hooded portion of the separating T so that they may be separated from the flow stream. If the clear area 114 is small enough in relation to the diameter of the sphere to be separated so that the sphere will roll into the hood, the extension bars 118 may be omitted, but preferably they are included.

Also provided are guide rails 120 which form, with the extension bars 118, a general passageway for the spheres guiding them to the opening 108. The guide rails 120 further prevent the spheres from lodging within the deep portion 122 of the T and insure their passage into the outlet opening 108. It should be noted that the deep portion 122 of the T is found when standard piping forms, T's and eccentric reducers, are used, and would not be present if the T were fabricated so as to present a lower surface linearly extending from the opening 124 into the opening 108, which is an obvious modification of the present T.

It is obvious by reference to the construction shown in FIG. 1 that the flowing stream will be divided into two portions, the first portion passing by way of the clear flow area 114, and a second portion passing by way of the liquid passage 112. The velocity of flow through the clear flow area 114 will be from 5 to 10 times higher than the velocity of flow under the hood 110, and thereby the separation of the spherical pig will be assured.

Figure 2:
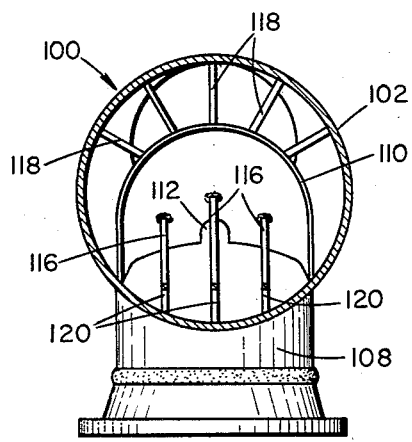
FIG. 2 is a cross-sectional view of the T of the present invention taken on line 2—2 of FIG. 1.

By reference to FIG. 2, the internal structure of the T of the present invention is made more clear. The T 100 is shown in cross section in FIG. 2, with the hood 110 being shown as extending across the lower portion of the T and generally enclosing the opening 108. The grate bars 116 and the guide rails 120 are clearly shown in the cross-sectional view as well as extension bars 118. The fluid passage 112 is shown to be centrally located in the hood 110, as is preferred. However, it should be noted that the passage 112 may be offset, or may comprise a number of holes drilled in the hood 112 at the downstream end thereof.

Figure 3:
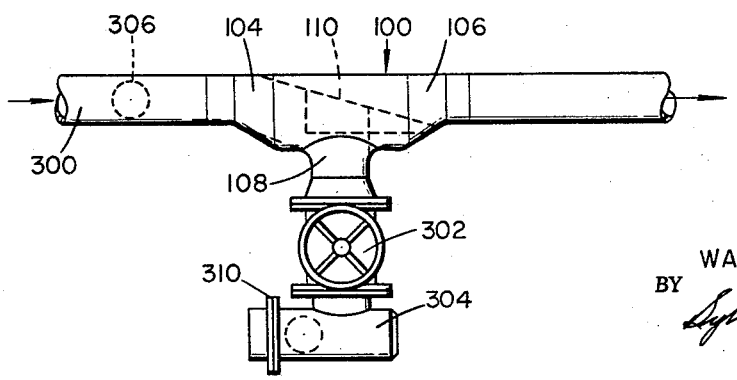
FIG. 3 is an illustration of a piping arrangement wherein the T of the present invention finds utility.

Referring now to FIG. 3, pipeline 300 is shown as comprising a straight-run length including a T 100 constructed according to the present invention. The pipeline structure comprises a valve 302 communicating with the opening 108 of the piping T, and communicating further with a spherical pig collector 304. A pig 306 passing through the pipeline toward the T of the present invention is thus passed by way of the hooded structure interior of T 100 through the valve 302 and into the collector 304, from whence it may be removed by means of flanged opening 310.

Thus, it is seen by the practice of the present invention that the separation of spherical pigs from a pipeline containing a flowing fluid may dependably be obtained and undue vibration of the piping prevented.

Since it is obvious that various modifications of the present invention may be made by following the teachings herein set forth without altering the essential nature of the invention, the scope of the present invention should be determined not by the specific examples hereinabove given, but rather by the appended claims.

I claim:
1. In a piping T comprising a cylindrical run section and a side outlet, said cylindrical run section having an upstream end and a downstream end, each of said ends comprising an eccentric reducing section so arranged as to have one element colinear with the element of the cylindrical run section which is diametrically opposite said side outlet, wherein the outlet opening for the side outlet is generally medially located in said run section, the improvement which comprises
concavo-convex ungula-shaped imperforate hood means mounted within said run section with the concave side thereof in enclosing relationship around said outlet opening,
said hood means having a major end opening toward the upstream end of the run section and spaced from the interior of said run section to provide a free-flow area between said hood means and said run section,
and a minor end with a fluid passageway formed therein,
said major end and said minor end extending beyond opposite sides of said outlet opening, said minor end being sealingly attached to the internal surface of the eccentric reducing section of said downstream end at a position generally diametrically opposite to said common element, whereby said ungula-shaped imperforate hood is positioned in said T at an angle to the line of flow therethrough,
and grate means extending in a plane normal to the centerline of the run section between the concave side of said hood means and the run section adjacent said opening and proximate said minor end.

2. Apparatus in accordance with claim 1 further comprising extension bars depending from said hood means and extending across said free-flow area to the interior of said run section.

3. Apparatus in accordance with claim 2 wherein the cross-sectional area of said fluid passageway is from 0.1 to 0.2 the cross-sectional area of said free-flow area.

References Cited by the Examiner

UNITED STATES PATENTS

| | | | |
|---|---|---|---|
| 265,600 | 10/82 | Hawes | 210—534 |
| 734,812 | 7/03 | Bush | 210—313 |
| 973,794 | 10/10 | Lightcap | 15—104.06 |
| 1,887,781 | 11/32 | Parr | 210—167 |
| 2,478,961 | 8/49 | Wortham | 15—104.06 |

FOREIGN PATENTS

| | | |
|---|---|---|
| 22,409 | 9/11 | Great Britain. |

HARRY B. THORNTON, *Primary Examiner.*

HERBERT L. MARTIN, *Examiner.*